(12) United States Patent
Kariya et al.

(10) Patent No.: US 10,845,164 B2
(45) Date of Patent: Nov. 24, 2020

(54) BLAST MITIGATING RESTRAINT SYSTEM

(71) Applicant: BAE Systems Land & Armaments L.P., Arlington, VA (US)

(72) Inventors: Brian Kariya, Los Gatos, CA (US); Roy John Buchmann, San Jose, CA (US); Parmjit Paul Singh, Pleasanton, CA (US); Mei Lam, San Jose, CA (US); Scott Greenlee, San Jose, CA (US); Jeff Faul, Los Gatos, CA (US); Wing Ng, Menlo Park, CA (US); Michael McCullough, San Jose, CA (US); Stu Nakashima, San Jose, CA (US); Yaping Zhu, Fremont, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 35 days.

(21) Appl. No.: 15/827,765

(22) Filed: Nov. 30, 2017

(65) Prior Publication Data

US 2018/0149451 A1     May 31, 2018

Related U.S. Application Data

(60) Provisional application No. 62/428,080, filed on Nov. 30, 2016.

(51) Int. Cl.
*F41H 7/04*     (2006.01)
*B62D 55/108*     (2006.01)

(52) U.S. Cl.
CPC .......... *F41H 7/042* (2013.01); *B62D 55/1083* (2013.01)

(58) Field of Classification Search
CPC ..... F41H 7/042; F41H 7/044; B62D 55/1083; B62D 55/108
See application file for complete search history.

(56) References Cited

U.S. PATENT DOCUMENTS 1,429,449 A    9/1922   Norelius
3,262,522 A *   7/1966   Johnson ............... B60G 17/005
                                                                               180/9.1

(Continued)

FOREIGN PATENT DOCUMENTS

EP        0937634        8/1999

OTHER PUBLICATIONS

ButlerBuilt BBP-4922 Sprint Car Front Axle Tether (https://www.speedwaymotors.com/ButlerBuilt-BBP-4922-Sprint-Car-Front-Axle-Tether,92796.html) (https://web.archive.org/web/20150826225218/http://www.speedwaymotors.com/ButlerBuilt-BBP-4922-Sprint-Car-Front-Axle-Tether,92796.html) (Year: 2015).*

(Continued)

*Primary Examiner* — Ruth Ilan
*Assistant Examiner* — Michael R Stabley
(74) *Attorney, Agent, or Firm* — Patterson Thuente Pedersen, P.A.

(57) ABSTRACT

A torsion bar restraint system for tracked combat vehicles that aids in the improvement of occupant survival rates when associated with asymmetric threats. The blast mitigating restraint system can reduce the dynamic deflection of torsion bars based on the severity of the blast impulse as needed. Systems comprise one or more components that secure the torsion bar to the hull for protecting against dynamic deflection and lateral displacement. The two disclosed components, an end restraint device and an M-Ring restraining device, can be used in conjunction or independently from each other based on the type of threat likely to be encountered.

17 Claims, 4 Drawing Sheets

(56) References Cited

U.S. PATENT DOCUMENTS

| | | | |
|---|---|---|---|
| 3,504,930 A * | 4/1970 | Kozowyk | B62D 55/1083 |
| | | | 180/9.1 |
| 3,566,825 A | 3/1971 | Ruf | |
| 4,194,761 A * | 3/1980 | Falk | B60G 11/185 |
| | | | 267/284 |
| 4,966,386 A * | 10/1990 | Werdich | B60G 11/225 |
| | | | 267/276 |
| 5,909,780 A | 6/1999 | De Andrade | |
| 6,431,531 B1 | 8/2002 | Yu et al. | |
| 6,447,073 B1 | 9/2002 | Goettker | |
| 6,658,984 B2 | 12/2003 | Zonak | |
| 8,191,911 B1 | 6/2012 | Reynolds | |
| 8,833,795 B2 * | 9/2014 | Riedl | B62D 55/1083 |
| | | | 280/679 |
| 2004/0090048 A1 | 5/2004 | Yoshida et al. | |

OTHER PUBLICATIONS

International Search Report and Written Opinion from PCT Application PCT/US2017/063982, dated Mar. 23, 2018, 14 pgs.
International Preliminary Report on Patentability from PCT Application PCT/US2017/063982, dated Jun. 13, 2019, 11 pgs.

\* cited by examiner

BLAST MITIGATING RESTRAINT SYSTEM

RELATED APPLICATION

The present application claims the benefit of U.S. Provisional Application No. 62/428,080 entitled "BLAST MITIGATING RESTRAINT SYSTEM", filed Nov. 30, 2016, which is incorporated herein by reference in its entirety.

FIELD OF THE INVENTION

The present invention is directed to restraint systems for improved occupant safety within a vehicle and more specifically to restraining devices to reduce dynamic deflection of vehicle torsion bars.

BACKGROUND OF THE INVENTION

The use of asymmetric threats has become more prevalent by military forces deployed in hostile environments. Typical threats used to attack combat vehicles consist of improvised explosive devices (IEDs) and anti-tank mines that can wreak havoc to onboard crew when attacked. The confined spaces between the occupant floor and hull bottom pose a severe threat to the occupants in the event of an explosive blast event. The blast can impact the structure as well as sending lethal fragments into the crew area.

Torsion bars typically occupy these spaces between the floor and the hull. When encountered by high strain rates and accelerative loads, the torsion bars can deflect into the occupant compartment and can transmit lethal shock loads. Furthermore, the torsion bars can themselves become secondary projectiles incapacitating the occupants.

Specifically, suspension components such as torsion bars can deflect into the crew compartment when subjected to high strain rates associated with a blast event. Restraining devices if employed properly can restrain the effects of the torsion bar deflection and therefore establish a "safe zone" of, for example, the floor height required to prevent catastrophic loss of occupants from the effects of accelerative blast loads.

There is a need to develop innovative blast mitigating restraint systems to reduce the effects caused by these types of threats and to improve occupant survivability.

SUMMARY OF THE INVENTION

The present disclosure is an innovative solution for a blast mitigating restraint system that increases occupant survivability within the space and weight constraints of existing systems by safely securing the torsion bars during a blast event.

The present invention was conceived in response to a need to develop a torsion bar restraint system for tracked combat vehicles that improves the occupant survival rate when associated with asymmetric threats.

A blast mitigating restraint system can reduce the dynamic deflection of torsion bars based on the severity of the blast impulse as needed. The present disclosure includes two devices, an M-Ring Restraining Device and an End Restraint Device that secures the torsion bar against dynamic deflection and lateral displacement. These systems can be used in conjunction or independently from each other based on the type of threat likely to be encountered. They can be tailored within space claim requirements without degradation to the performance while maintaining or enhancing the vehicles payload capacities.

The blast mitigating restraint system can be packaged as kits that can be easily retrofitted to vehicle platforms already in service. Thus, the solution may vary depending on vehicle variant, its existing threat level, and expected threats. The blast mitigating restraint system devices are interchangeable and can be easily adapted and/or retrofitted to any vehicle systems currently fielded.

One objective of blast mitigating restraint system is to integrate torsion bar restraining devices that confine their deflection and lateral displacement during a blast event within a prescribed space with minimal modifications to the vehicle platform.

The end restraint system prevents the lateral displacement of the torsion bars from moving inward which allows them to separate from their mounting provision and let loose. The M-Ring device is sized to restrict the dynamic deflection of the torsion bar limiting its displacement within the prescribed space.

These devices are sized to withstand the blast effects from mine/IED threats and can be retrofitted to existing vehicles. The robust interchangeable design satisfies the specified ballistic requirements without sacrificing vehicle operations. Blast mitigating restraint system devices can either be bolted on to existing parts or can be new parts that can be easily integrated.

The blast mitigating restraint system utilizes common materials and mounting hardware that can withstand the impulse loads associated with a blast event.

Either blast mitigating restraint system can be used independently or in conjunction with each other depending on the specific requirement with little or no impact to vehicle operations.

The torsion bars used in blast mitigating restraint system are readily available and in the supply system of US military forces.

The present disclosure provides the most weight and cost efficient method and allows flexibility of adaptation to various vehicle platforms using existing vehicle structure mounting surfaces with minimal impact to adjacent installations. The blast mitigating restraint system is configured to enable commonality among platforms and to reduce the logistics footprint to the soldier. The modular blast mitigating restraint system can be installed on a wide variety of combat vehicles, and can be easily integrated in order to provide protection to critical vehicle areas with minimal impact to vehicle performance.

The present invention is a blast mitigating restraint system comprising:

An end restraint device, said end restraint device utilizes an existing torsion bar and adds an insert and end cap to the torsion bar to restrict lateral displacement. For new torsion bars, the features of an end restraint device can be integrated into the bar as a one-piece construction, thereby reducing the number of parts. The technology is designed to be modular and can be integrated/retrofitted onto any vehicle platform, An M-Ring device fits around the torsion bars and is connected to the hull. The M-Ring restrains deflection of the torsion bar.

A common design simplifies Battle Damage and Repair (BDAR) and vehicle maintenance operations. Installation of the disclosed devices can be performed using common tools. The blast mitigating restraint system are typically made of high strength material, typically steels, and titanium, if necessary, to meet weight constraints.

The blast mitigating restraint system can be applied to a variety of vehicle platforms, ranging from light vehicles to battle tanks. The present disclosure was made to address the need for developing a technology that could counter asymmetric threats as they become more potent in current and future battlefields.

The present invention is a torsion bar restraint system for a continuous track vehicle, the system comprising; a torsion bar having a length and a pair of opposing ends, said torsion bar operably connected to a hull of the continuous track vehicle, the torsion bar including an end restraint device, the restraining device restricts lateral displacement of the torsion bar; and a restraining clip that is disposed along the length of the torsion bar.

The end restraint device may be integral to the torsion bar. The restraint device may include an integral stud at the end of the torsion bar. The torsion bar restraint system may include an integral shoulder at the end of the torsion bar.

The torsion bar restraint system may be retrofitted to an existing torsion bar so that the restraint device includes an orifice for mounting a stud at the end of the torsion bar and an orifice for mounting a shoulder at the opposing end of the torsion bar.

The torsion bar restraint system may include multiple restraining clips which are equally spaced along the length of the torsion bar.

The torsion bar restraint system may include multiple restraining clips which are equally spaced in pairs along the length of the torsion bar.

The restraining clip may be shaped to restrain adjacent torsion bars. The restraining clips may include a pair of arches with a center divider so that the torsion bars fit within the arch. The restraining clips further include mounting portions for connecting the restraining clip to the hull. In one embodiment, the restraining clip has an M shape.

The present invention is a torsion bar restraint system for a continuous track vehicle, the system comprising; a torsion bar having a length and a pair of opposing ends, said torsion bar operably connected to a hull of the continuous track vehicle, the torsion bar including an end restraint device at the opposing ends, wherein the restraint device includes a stud at one opposing end of the torsion bar and a shoulder at the opposite opposing end.

The torsion bar restraint system may further include a plurality of restraining clips disposed along the length of the torsion bar, said clips having an M shape so as to restrain adjacent torsion bars.

The present invention can be used with existing torsion bars and retrofitted or new torsion bar may be manufactured to include the stud and shoulder feature.

Depending on the treat, the M clips and/or the shoulder and stud features may be used together or separately.

The present invention also includes a method of restraining a torsion bar mounted to a continuous tracked vehicle, the method comprising:
 a. installing a torsion bar having a stud at a first end of the torsion bar and a shoulder at the opposing end of the torsion bar to a hull of the vehicle;
 b. fastening the shoulder end of the torsion bar with a retaining plug and nut; and
 c. installing a restraining clip along a length of the torsion bar to the hull of the vehicle.
The method further including installing restraining clips in pairs across adjacent torsion bars. The method may include retrofitting an existing torsion bar to have the shoulder and stud at opposing ends.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

While the invention has been described and illustrated in several embodiments, it should be understood that the embodiments are examples and are not limited by the figures of the accompanying drawings.

DETAILED DESCRIPTION OF THE DRAWINGS

Various embodiments of the disclosure are described in more detail hereinafter with reference to the accompanying drawings, in which some, but not all embodiments are shown in the figures. These disclosures may be embodied in many different forms and methods and should not be construed as limited to the embodiments set forth herein, rather, these embodiments are provided so that this disclosure will satisfy applicable legal requirements.

Figure 1:
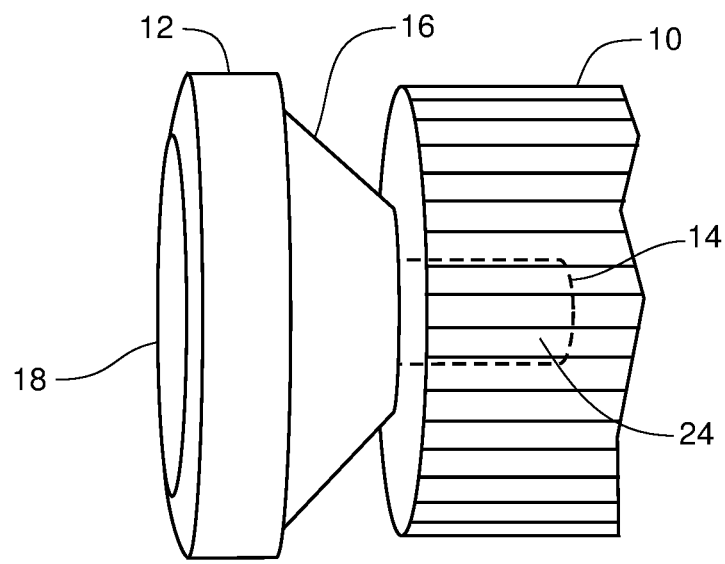
FIG. 1 depicts the side view of a shoulder end restraint device mounted/inserted into the end of a torsion bar.

In the present invention a torsion bar 10 may be retrofitted to provide better survivability to the occupants of a vehicle. FIG. 1 illustrates an existing torsion bar 10 that has a larger end cap ("Shoulder") 12 inserted into orifice 14. The existing torsion bar 10 would be machined to include an orifice 14 to which the shoulder 12 is placed. Shoulder 12 has a neck 24 which may be welded or threaded into bar 10. A gap 16 exists between the end of bar 10 and the shoulder cap 18.

Figure 2:
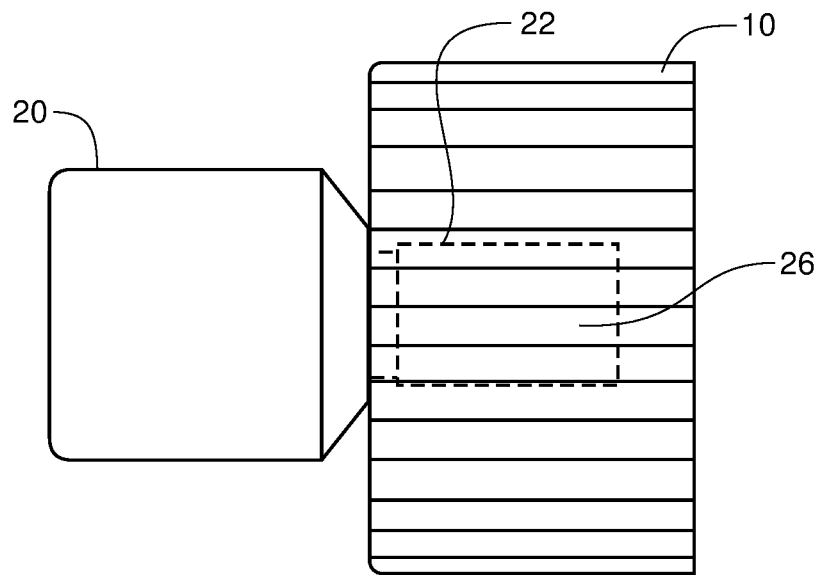
FIG. 2 depicts the side view of an example of a stud end restraint device mounted/inserted into the end of a torsion bar.

FIG. 2 illustrates one embodiment of the disclosure. FIG. 2 depicts a torsion bar 10 in which a stud 20 has been inserted into orifice 22. The existing torsion bar 10 would be machined to include an orifice 22 to which the neck 24 of stud 20 is welded or threaded into.

As depicted in FIGS. 1 and 2, the stud 20 and shoulder 12 may be a variety of different sizes. The sizes may be tailored to make use/maintenance/installation easier and more efficient. The tools a user may have on hand when using the blast mitigating restraint system may determine the size of the shoulder 12 and stud 20.

The end cap fitting insert necks 24 and 26 is configured in a way as to conform to any varieties of indexing/splines the torsion bar may have, thus, allowing for additional interchangeability. These variations allow for prevention of lateral displacement of the torsion bar from moving inward which allows them to separate from their mounting provision.

Figure 3:
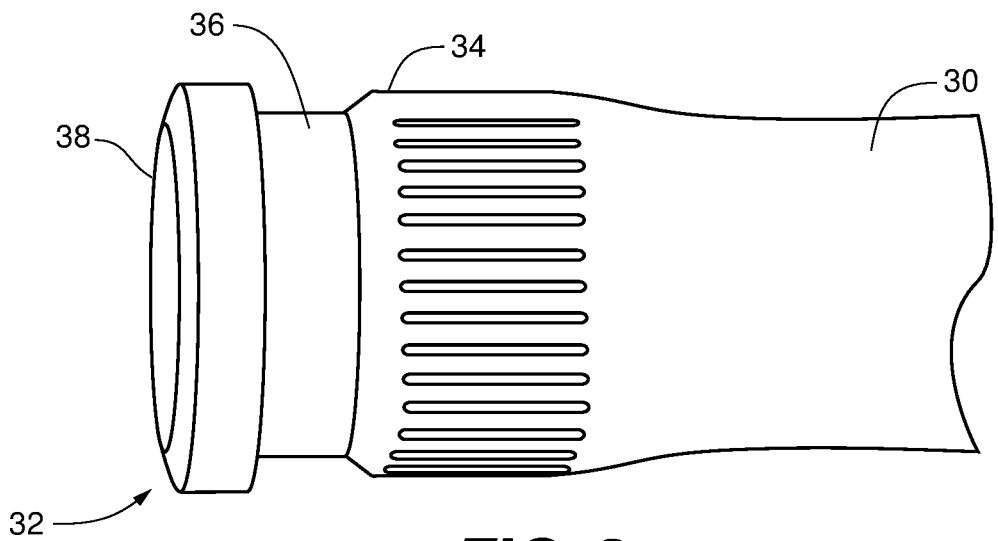
FIG. 3 depicts the side view of an example of an integrated shoulder end restraint device.

FIG. 3 is an illustration of a torsion bar 30 that has integrated the end cap fitting insert. FIG. 3 illustrates a torsion bar 30 that has a larger end cap ("Shoulder") 32. The torsion bar 30 would be machined to include the shoulder 32 which would then be placed in a vehicle. Shoulder 32 has a gap 36 exists between the end of bar 34 and the shoulder cap 38.

Figure 4:
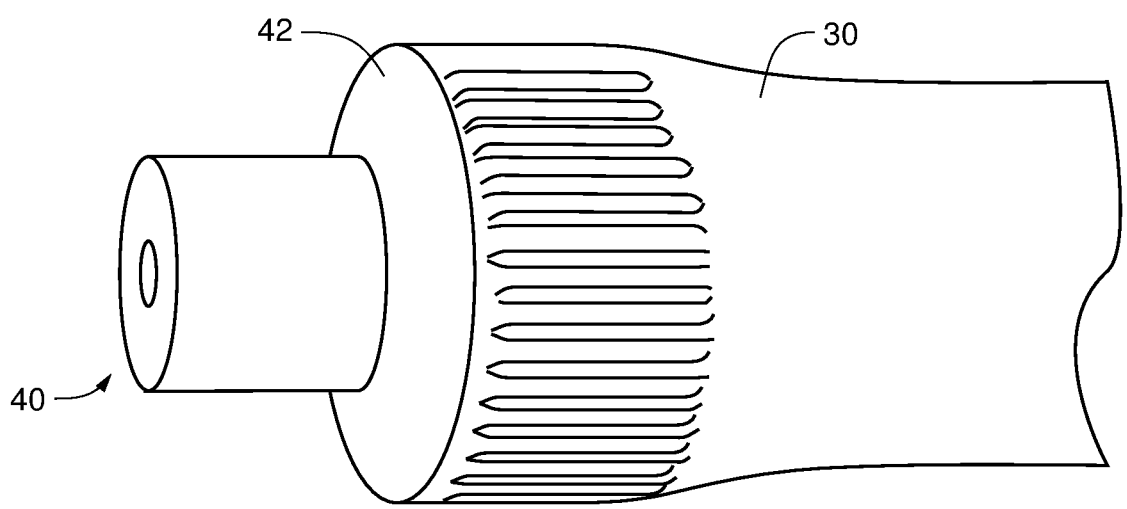
FIG. 4 depicts the side view of an example of an integrated stud end restraint device.

FIG. 4 is an illustration of a torsion bar that has integrated the end cap fitting insert and Smaller Cap End from FIG. 2 into a one-piece construction. FIG. 4 illustrates a torsion bar 30 in which a stud 40 has been machined. The stud 40 extends from the distal end 42 of rod 30. Stud 40 has a smaller diameter than the rod 30.

These one piece torsion bars of FIGS. 3 and 4, while possessing similar adaptations as FIGS. 1 and 2, reduce the number of parts and allow greater efficiency in installation, maintenance and applicability.

Figure 5:
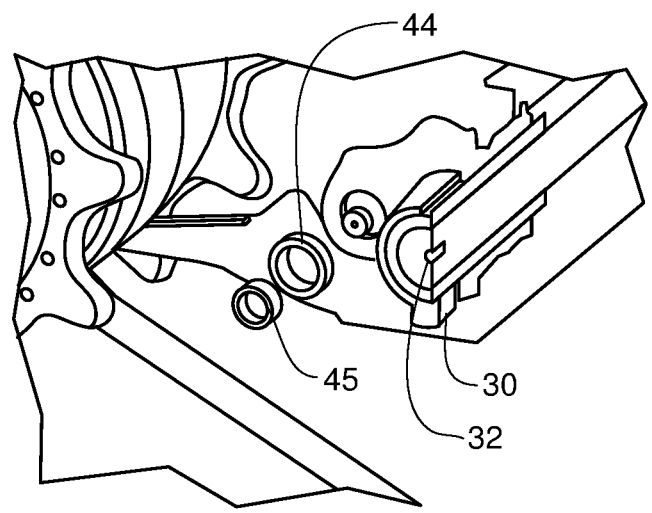
FIG. 5 depicts a side perspective view of the mounting of the torsion bars of the present invention.

FIG. 5 depicts a side perspective view of the mounting of the torsion bars of the present invention. The end of bar 30 with shoulder 32 is disposed and restrained by a retaining plug 44 and spanner nut 46.

Figure 6:
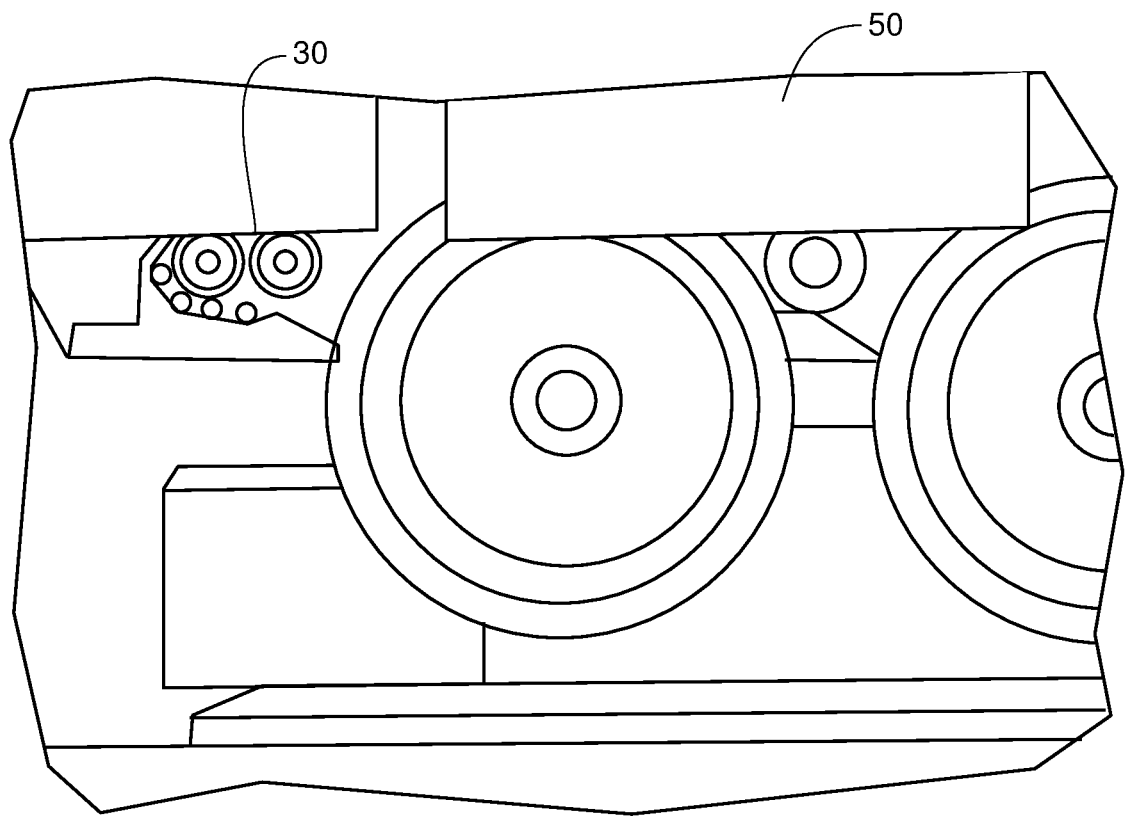
FIG. 6 depicts a side perspective view of the placement of the torsion bars of the present invention on a tracked vehicle.

FIG. 6 depicts a side perspective view of the placement of the torsion bar 30 of the present invention on a tracked vehicle 50 after the installation.

Figure 7:
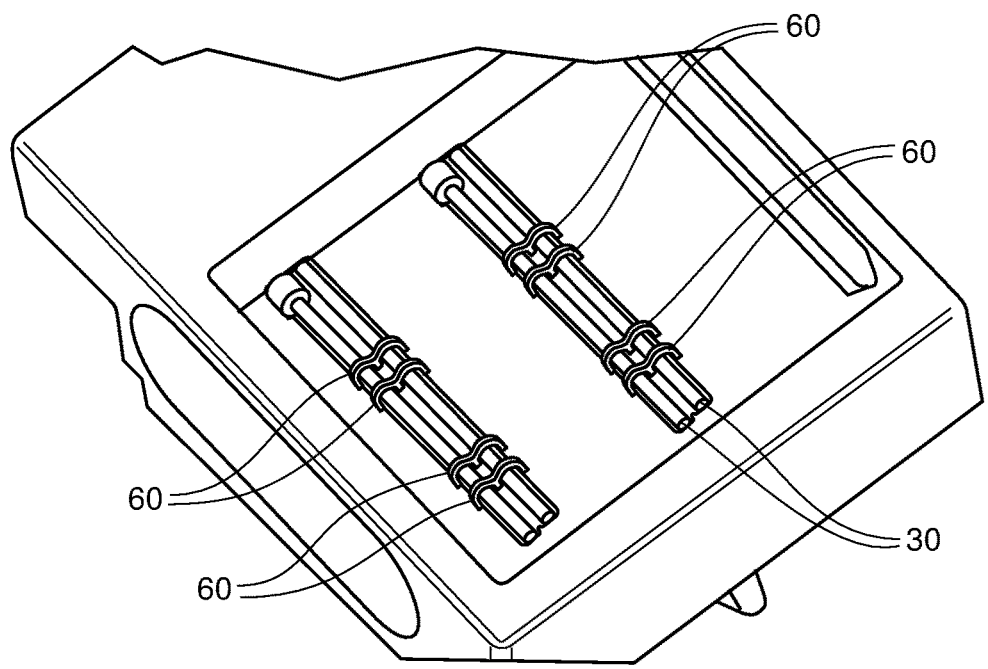
FIG. 7 is a perspective view of the End Restraint Device torsion bars and an M-Ring restraining device used in combination.
Figure 8:
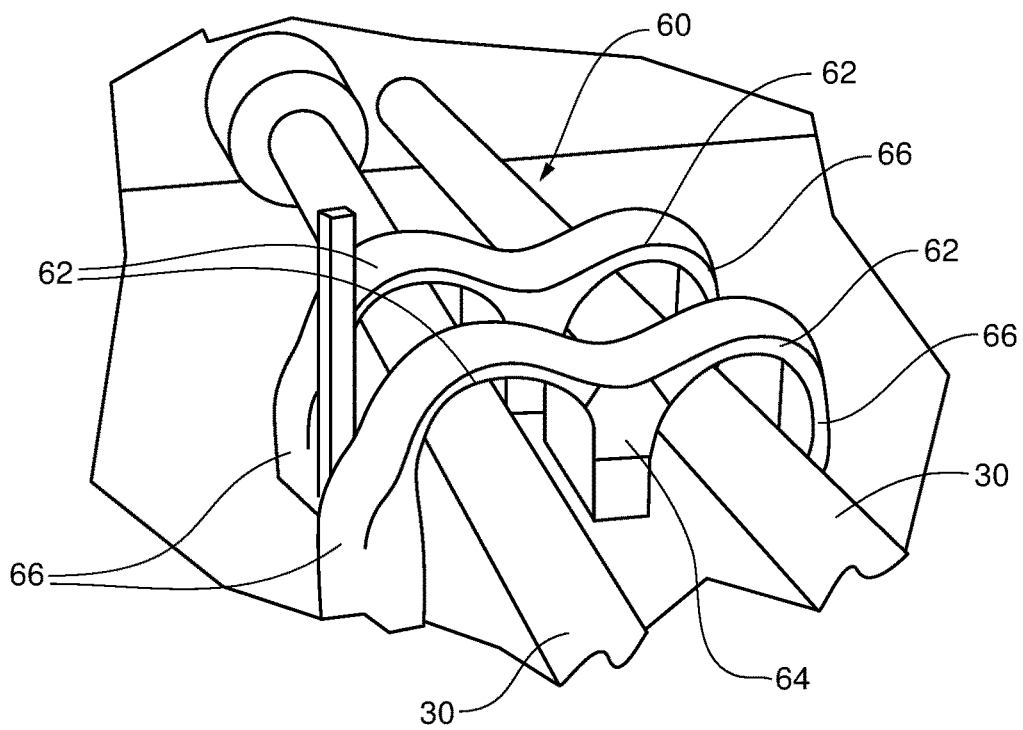
FIG. 8 is a close up view of the M-Ring restraining device from FIG. 7.

FIGS. 7 and 8 illustrates an embodiment of the blast mitigation restraint system with rods 30 and restraint clips 60. The clips 60 are generally referred to as M-rings based on their shape. One or more M-Rings 60 may be attached onto an applicable surface of the vehicle. An applicable surface may be any surface of the vehicle available or necessary to aid in the restriction of dynamic deflection of a torsion bar 30. The M-Ring's size is determined by the availability of space available and the amount of displacement desired to be restricted. Different sizes may be used throughout the vehicle to account for any space restrictions and/or alterations to the desired limitations of displacement of the torsion bar. As seen in FIG. 7b, eight M-Rings 60 are utilized in various locations and are attached to the bed of the vehicle 62, thus restricting the torsion bar's 30 ability to shift.

FIG. 8 depicts a closer view of the M-Ring 60 from FIG. 7. In this embodiment M-Ring 60 includes a pair of arches 62, a center support 64 and side supports 66. Each torsion bar 30 is restrained under respective arch 62. Other variations are possible including single restraining clips, clips having various shapes instead of an arch.

Utilization of End Caps and M-Rings can be used independently or in conjunction, allowing a variety of different combinations that may be tailored to a specific user's need. Combinations of the embodiments disclosed and other embodiments not specifically disclosed may be utilized.

While a preferred embodiment of the present disclosure has been shown and described herein, it will be appreciated that various changes and modifications may be made therein without departing from the spirit.

What is claimed is:

1. A torsion bar restraint system for a continuous track vehicle, the system comprising;
   a torsion bar having a length and a pair of opposing ends, said torsion bar operably connected to a hull of the continuous track vehicle, the torsion bar including an end restraint device which is disposed at opposing ends of the torsion bar and extends beyond a torsion bar spline, the end restraint device restricts lateral displacement of the torsion bar;
   and multiple restraining clips disposed along the length of the torsion bar.

2. The torsion bar restraint system of claim 1 wherein the end restraint device is integral to the torsion bar.

3. The torsion bar restraint system of claim 2 wherein the end restraint device includes an integral stud at the end of the torsion bar.

4. The torsion bar restraint system of claim 2 wherein the end restraint device includes an integral shoulder at the end of the torsion bar.

5. The torsion bar restraint system of claim 1 wherein the end restraint device includes an orifice for mounting a stud at the end of the torsion bar.

6. The torsion bar restraint system of claim 1 wherein the end restraint device includes an orifice for mounting a shoulder at the end of the torsion bar.

7. The torsion bar restraint system of claim 1 wherein the multiple restraining clips are equally spaced along the length of the torsion bar.

8. The torsion bar restraint system of claim 7 wherein the multiple restraining clips are equally spaced in pairs along the length of the torsion bar.

9. The torsion bar restraint system of claim 7 wherein the multiple restraining clip are shaped to restrain an adjacent torsion bar.

10. The torsion bar restraint system of claim 7 wherein the multiple restraining clips include a pair of arches with a center divider.

11. The torsion bar restraint system of claim 10 wherein the multiple restraining clips further includes mounting portions for connecting the restraining clip to the hull.

12. The torsion bar restraint system of claim 1 wherein the multiple restraining clips have an M shape.

13. A torsion bar restraint system for a continuous track vehicle, the system comprising;
   a torsion bar having a length and a pair of opposing ends, said torsion bar operably connected to a hull of the continuous track vehicle, the torsion bar including an end restraint device at the opposing ends of the torsion bar, wherein a stud is disposed at one opposing end of the torsion bar and a shoulder at an opposite opposing end.

14. The torsion bar restraint system of claim 13 wherein the torsion bar restraint system further includes a plurality of restraining clips disposed along the length of the torsion bar, said clips having an M shape so as to restrain adjacent torsion bars.

15. A method of restraining a torsion bar mounted to a continuous tracked vehicle, the method comprising:
   a. installing a torsion bar having a stud at a first end of the torsion bar and a shoulder at the opposing end of the torsion bar to a hull of the vehicle;
   b. fastening the shoulder end of the torsion bar with a retaining plug and nut; and
   c. installing at least one restraining clip along a length of the torsion bar to the hull of the vehicle.

16. The method of claim 15 further including installing restraining clips in pairs across adjacent torsion bars.

17. The method of claim 15 further including retrofitting an existing torsion bar to have the shoulder and stud at opposing ends.

* * * * *